US006326084B1

(12) United States Patent
Ouhadi et al.

(10) Patent No.: US 6,326,084 B1
(45) Date of Patent: *Dec. 4, 2001

(54) METHOD FOR HIGH FREQUENCY WELDING OF NON-POPULAR THERMOPLASTIC ELASTOMERS

(75) Inventors: Trazollah Ouhadi, Liege; Jacques Horrion, Tilff; Ernst Van Issum, Grez Doiceau, all of (BE)

(73) Assignee: Advanced Elastomer Systems, L.P., Akron, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,967

(22) Filed: Apr. 21, 1998

(30) Foreign Application Priority Data

May 16, 1997 (EP) .................................................. 97108014

(51) Int. Cl.[7] .................................................. B32B 27/06
(52) U.S. Cl. .................................... 428/474.7; 156/273.7; 525/93; 525/179; 525/184
(58) Field of Search ................ 156/273.7; 525/93, 525/184, 179; 428/474.7

(56) References Cited

U.S. PATENT DOCUMENTS

| 2,667,437 | 1/1954 | Zoubek | 154/126.5 |
|---|---|---|---|
| 3,336,173 | 8/1967 | Renfroe | 156/148 |
| 4,247,665 | 1/1981 | Daniels et al. | 525/179 |
| 4,268,338 | 5/1981 | Peterson | 156/251 |
| 4,338,413 | 7/1982 | Coran et al. | 525/179 |
| 4,728,566 | 3/1988 | Lancaster et al. | 428/286 |
| 5,177,147 | * 1/1993 | Spenadel et al. | 525/93 |

FOREIGN PATENT DOCUMENTS

| 0 028 106 A1 | 5/1981 | (EP) . | |
|---|---|---|---|
| 0540842 | * 5/1993 | (EP) . | |
| 0 540 842 A1 | 5/1993 | (EP) . | |
| 58-57455 | * 4/1983 | (JP) | 525/93 |
| WO 95/26380 | 10/1995 | (WO) . | |

OTHER PUBLICATIONS

Derwent Abstract, Japanese Patent Application 153803/81, Sep. 30, 1981.

Derwent Abstract, Japanese Patent Application 223613/91, Aug. 9, 1991.

Derwent Abstract, Japanese Patent Application 2852229/93, Nov. 15, 1993.

* cited by examiner

*Primary Examiner*—John J. Gallagher
(74) *Attorney, Agent, or Firm*—William A. Skinner

(57) ABSTRACT

The invention relates to a method of high frequency welding of non-polar thermoplastic elastomers characterized in that said elastomers comprise a polar modifier. Furthermore, the invention relates to shaped articles obtainable by said method.

9 Claims, No Drawings

METHOD FOR HIGH FREQUENCY WELDING OF NON-POPULAR THERMOPLASTIC ELASTOMERS

BACKGROUND OF THE INVENTION

1. Field of the Invention

The present invention relates to a method for high frequency welding of non-polar thermoplastic elastomer compositions comprising a suitable modifier. Furthermore, the present invention relates to shaped articles obtainable by the method according to the present invention.

Conventional non-polar thermoplastic elastomer compositions comprising a thermoplastic polyolefin homopolymer or copolymer and an olefinic rubber which is fully crosslinked, partially crosslinked or not crosslinked and/or block-copolymer of styrene/conjugated diene/styrene and/or its hydrogenated derivative, optionally in the presence of common additives can only be adhered together by using adhesives or must be heat welded by the hot air or hot plate method. These conventional methods present several disadvantages such as, in the adhesive method, the need to modify the adhering surface, (for instance, by priming, corona treatment, etching, etc.), selection of the suitable adhesive, etc., and in the hot air and hot plate method, the relatively slow speed, the difficulty to control the temperature to obtain adequate welding without burning the surface.

High frequency welding is, however, not feasible with those thermoplastic elastomers. However, there is a need in the industry to make those thermoplastic elastomers accessible to the high frequency welding method.

The high frequency welding method is a well-known, well-established method of heat-sealing materials together, which method can easily be carried out. Said method is used in many sections of the industry such as inflatables (boats, containers, life-rafts, oil-booms, etc.), automotive, automotive ancillaries, office and school equipment, tenting, tarpaulins, packaging and for many other purposes, wherever proper adhesion is desired.

2. Description of the Related Art

U.S. Pat. No. 4,728,566 pertains to a composite article comprising a polymer foam having HF-bonded thereto at least one surface layer, wherein the HF-bonding is effected by a layer of HF-bondable polymer film between said foam and said surface layer, said HF-bondable polymer film comprising a carbon monoxide-containing olefin interpolymer and said polymer foam being selected from the group consisting of various foamed polymers. The surface layer is selected from the group comprising polymers, fabrics, leather, cellulosic products, wood, vitreous materials, metal foils, paper and foams and the HF-bondable polymer film comprises at least one of ECO, ECOAA, ECOMAA and ECOVA.

U.S. Pat. No. 2,667,437 discloses a method to heat-weld two non-polar, unmodified thermoplastics by exposing them to a pair of hot electrodes which are covered with a fixed conductive polymer.

U.S. Pat. No. 4,268,388 pertains to almost the same welding-method as disclosed in U.S. Pat. No. 2,667,437.

U.S. Pat. No. 3,336,173 discloses the addition of a polyamide to non-polar thermoplastics in order to obtain a HF-weldable product without taking into consideration the very poor properties of such a blend due to the lack of compatibility between the non-polar thermoplastic and the polar polyamide.

EP-A-0,028,106 discloses the use of a special bituminous petroleum derivative as a HF-welding promotor in chlorinated PE/chlorosulfonated PE.

The available prior art does not suggest how non-polar thermoplastic elastomers could be welded by the high frequency welding method.

SUMMARY OF THE INVENTION

It has now surprisingly been found that non-polar thermoplastic elastomers can be welded together by conventional high frequency welding methods after adding to said non-polar thermoplastic elastomer composition an effective amount of a compatible, polar modifier.

The term "compatible" means that the modifier has certain interactions with the polymer-matrix in order to maintain the overall physical properties of the polymer, i.e., the thermoplastic elastomer.

The thermoplastic elastomer may be in the form of any shaped article, such as films, sheets, boards, extruded articles injection or blow-molded parts, etc.

In detail, the present invention pertains to a method of high frequency welding of non-polar thermoplastic elastomers characterized in that the non-polar thermoplastic elastomer comprises as the polar modifier (i) a copolymer obtainable by condensation reaction of about 10 to about 90 weight % of a functionalized polymer with about 90 to about 10 weight % of a polyamide, based on the total weight of functionalized polymer and polyamide, or (ii) a functionalized polymer and a polyamide in the amounts defined under (i) or (iii) a mixture of (i) and (ii).

It is preferred that the functionalized polymer contains no less than about 0.3 weight %, based on the total weight of the functionalized polymer, of at least one functional group-containing monomer.

It is preferred to add as an effective amount at least 3 weight parts of (i), (ii) or (iii), per 100 weight parts of the non-polar thermoplastic elastomer composition. More preferably at least 7 weight parts of (i), (ii) or (iii) are added. For most purposes the addition of up to 60 weight parts, more preferably up to 40 weight parts of (i), (ii) or (iii), per 100 weight parts of the non-polar thermoplastic elastomer is sufficient.

The non-polar thermoplastic elastomer is preferably selected from (A)
  (a) a thermoplastic polyolefin homopolymer or copolymer, and
  (b) an olefinic rubber which is fully cross-linked, partially crosslinked or not crosslinked, and optionally
  (c) common additives;

(B)
  (a) a block-copolymer of styrene/conjugated diene/styrene and/or its hydrogenated derivative, optionally compounded with
  (b) a thermoplastic polyolefin homopolymer or copolymer and/or
  (c) common additives and (C) any blend of (A) and (B).

In terms of the present invention the terms "non-polar thermoplastic elastomer" or "non-polar thermoplastic elastomer composition" means the thermoplastic elastomeric polymeric composition including optional additives.

Specifically, the present invention relates to a method of high frequency welding of an article or articles of a non-polar thermoplastic elastomer composition comprising (A)
 (a) a thermoplastic polyolefin homopolymer or copolymer, and
 (b) an olefinic rubber which is fully cross-linked, partially crosslinked or not crosslinked, and optionally
 (c) common additives;

(B)
 (a) a block-copolymer of styrene/conjugated diene/styrene and/or its hydrogenated derivative, optionally compounded with
 (b) a thermoplastic polyolefin homopolymer or copolymer and/or
 (c) common additives and (C) any blend of (A) and (B)
characterized in that at least 3 parts by weight of a polar compatible additive selected from
 (i) a copolymer obtainable by condensation reaction of about 10 to about 90 weight % of a functionalized polymer with
 about 90 to about 10 weight % of a polyamide, based on the total weight of functionalized polymer and polyamide, or
 (ii) a functionalized polymer and a polyamide in the amounts defined under (i) or
 (iii) a mixture of (i) and (ii),
are added to 100 weight parts of (A), (B) or (C), under the proviso that the functionalized polymer contains no less than about 0.3 weight %, based on the total weight of the functionalized polymer, of at least one functional group-containing monomer.

The preferred amounts of (i), (ii) and (iii) in the nonpolar thermoplastic elastomer (A), (B) or (C) are mentioned above.

DESCRIPTION OF THE PREFERRED EMBODIMENTS

I. Thermoplastic Elastomers
(i) Thermoplastic Elastomer (A)
Polyolefin:

Polyolefins suitable for use in the compositions (A), (B) or (C) of the invention include thermoplastic, crystalline polyolefin homopolymers and copolymers. They are desirably prepared from monoolefin monomers having 2 to 7 carbon atoms, such as ethylene, propylene, 1-butene, isobutylene, 1-pentene, 1-hexene, 1-octene, 3-methyl-1-pentene, 4-methyl1-pentene, 5-methyl-1-hexene, mixtures thereof and copolymers thereof with (meth)acrylates and/or vinyl acetates. Preferred, however, are monomers having 3 to 6 carbon atoms, with propylene being preferred. As used in the specification and claims the term polypropylene includes homopolymers of propylene as well as reactor and/or random copolymers of polypropylene which can contain about 1 to about 20 wt % of ethylene and/or an a-olefin comonomer of 4 to 16 carbon atoms, and mixtures thereof. The polypropylene can be highly crystalline isotactic or syndiotactic polypropylene. Commercially available polyolefins may be used in the practice of this invention. Further polyolefins which can be used in terms of the invention are high, low, linear-low, very low-density polyethylenes and copolymers of ethylene with (meth)acrylates and/or vinyl acetates.

The polyolefins mentioned above can be made by conventional Ziegler/Natta catalyst-systems or by metallocene-based catalyst-systems.

The amount of polyolefin found to provide useful compositions (A) is generally from about 8 to about 90 weight percent, under the proviso that the total amount of polyolefin (a) and rubber (b) is at least about 35 weight percent, based on the total weight of the polyolefin (a), rubber (b) and optional additives (c). Preferably, the polyolefin content will range from about 10 to about 60 percent by weight.

The thermoplastic polyolefins homopolymers or copolymers which can optionally be used in the thermoplastic elastomer composition (B) are selected from the same polyolefins as mentioned above. The amount of the polyolefins used in composition (B) can be up to about 60 weight %, based on the total amount of composition (B).

Olefinic Rubber:

Suitable monoolefin copolymer rubbers comprise nonpolar, rubbery copolymers of two or more a-monoolefins, preferably copolymerized with at least one polyene, usually a diene. Saturated monoolefin copolymer rubber, for example ethylene-propylene copolymer rubber (EPM) can be used. However, unsaturated monoolefin rubber such as EPDM rubber is more suitable. EPDM is a terpolymer of ethylene, propylene and a non-conjugated diene. Satisfactory non-conjugated dienes include 5-ethylidene-2-norbornene (ENB); 1,4-hexadiene; 5 methylene-2-norbornene (MNB); 1,6-octadiene; 5-methyl-1,4-hexadiene; 3,7-dimethyl-1,6-octadiene; 1,3-cyclopentadiene; 1,4-cyclohexadiene and dicyclopentadiene (DCPD).

Butyl rubbers are also useful in the compositions of the invention. As used in the specification and claims, the term "butyl rubber" includes copolymers of an isoolefin and a conjugated monoolefin, terpolymers of an isoolefin with or without a conjugated monoolefin, divinyl aromatic monomers and the halogenated derivatives of such copolymers and terpolymers.

The useful butyl rubber copolymers comprise a major portion of isoolefin and a minor amount, usually less than about 30 wt %, of a conjugated multiolefin. The preferred copolymers comprise about 85–99.5 wt % of a $C_{4-7}$ isoolefin such as isobutylene and about 15–0.5 wt % of a multiolefin of 4–14 carbon atoms, such as isoprene, butadiene, dimethyl butadiene and piperylene. Commercial butyl rubber, chlorobutyl rubber, bromobutyl rubber, useful in the invention, are copolymers of isobutylene and minor amounts of isoprene with less than about 3% halogen for the halobutyl-derivatives. Other butyl co- and terpolymer rubbers are illustrated by the description in U.S. Pat. No. 4,916,180.

Another suitable copolymer within the scope of the olefinic rubber of the present invention is a copolymer of a $C_{4-7}$ isomonoolefin and a para-alkylstyrene, and preferably a halogenated derivative thereof. The amount of halogen in the copolymer, predominantly in the para-alkylstyrene, is from about 0.1 to 10 wt %. A preferred example is the brominated copolymer of isobutylene and para-methylstyrene. These copolymers are more fully described in U.S. Pat. No. 5,162,445.

A further olefinic rubber suitable in the invention is natural rubber. The main constituent of natural rubber is the linear polymer cis-1,4-polyisoprene. It is normally commercially available in the form of smoked sheets and crepe. Synthetic polyisoprene can also be used. Furthermore polybutadiene rubber and styrene-butadiene-copolymer rubbers can also be used.

Blends of any of the above olefinic rubbers can be employed, rather than a single olefinic rubber.

Further suitable rubbers are nitrile rubbers. Examples of the nitrile group-containing rubber include a copolymer rubber comprising an ethylenically unsaturated nitrile compound and a conjugated diene. Further, the copolymer rubber may be one in which the conjugated diene units of the copolymer rubber are hydrogenated.

Specific examples of the ethylenically unsaturated nitrile compound include acrylonitrile, α-chloroacrylonitrile, α-fluoroacrylonitrile and methacrylonitrile. Among them, acrylonitrile is particularly preferable.

Examples of the conjugated diene include 1,3-butadiene, 2-chlorobutadiene and 2-methyl-1,3-butadiene (isoprene). Among them, butadiene is particularly preferable.

Especially preferred nitrile rubbers comprise copolymers of 1,3-butadiene and about 10 to about 50 percent of acrylonitrile.

Other suitable rubbers in terms of the present invention are based on polychlorinated butadienes such as polychloroprene rubber. These rubbers are commercially available under the trade names Neoprene® and Bayprene®.

In preparing the compositions of the invention, the amount of olefinic rubber in composition (A) generally ranges from about 70 to about 10 weight percent, under the proviso that the total amount of polyolefin (a) and rubber (b) is at least about 35 weight %, based on the weight of the polyolefin (a), the rubber (b) and the optional additives (c). Preferably, the olefinic rubber content will be in the range of from about 50 to about 10 weight percent.

(ii) Thermoplastic Elastomer (B)

The thermoplastic elastomer (B) is a block-copolymer of styrene/conjugated diene/styrene, with the conjugated diene optionally being fully or partially hydrogenated, or mixtures thereof. Generally this block-copolymer may contain about 10 to about 50 weight %, more preferably about 25 to about 35 weight % of styrene and about 90 to about 50 weight %, more preferably about 75 to about 35 weight % of the conjugated diene, based on said block-copolymer. Most preferably, however, is a block-copolymer which contains about 30 weight % of styrene and about 70 weight % of the conjugated diene. The conjugated diene is selected from butadiene, isoprene or mixtures thereof. These block-copolymers are known in the art and are commercially available.

Optionally the block-copolymer may further be compounded with a polyolefin or a common additive or mixtures thereof. Thus, the thermoplastic elastomer (B) optionally further comprises up to about 60 weight % of (b) the thermoplastic polyolefin homopolymer or copolymer or the additives or mixtures thereof, based on the total weight of the block-copolymer (a) and (b). The thermoplastic polyolefins are selected from those mentioned above in context with the thermoplastic elastomer (A).

(iii) Thermoplastic Elastomer (C)

Another thermoplastic elastomers which can be modified with modifier mentioned herein below are blends of the thermoplastic elastomer (A) comprising the polyolefin, rubber and optionally additives with the thermoplastic elastomer (B) comprising the block-copolymer, optionally polyolefins and/or additives.

Preferred blends (C) contain about 5 to about 95 weight % of (A) and about 95 to about 5 weight % of (B) respectively, based on the total amount of (A) and (B). These blends can be prepared by common blending-processes known in the art.

II. Additives

In addition to the polyolefin, rubber and copolymer components, the compositions of the invention (A) and (B) include curatives and may also include reinforcing and non-reinforcing fillers, plasticizers, antioxidants, stabilizers, rubber processing oil, extender oils, lubricants, anti-blocking agents, antistatic agents, waxes, foaming agents, pigments, flame retardants and other processing aids known in the rubber compounding art. Such additives can comprise up to about 65 wt % of the total composition of polyolefins (a), rubber (b) and additives (c). Fillers and extenders which can be utilized include conventional inorganics such as calcium carbonate, clays, silica, talc, titanium dioxide, carbon black and the like. The rubber processing oils generally are paraffinic, naphthenic or aromatic oils derived from petroleum fractions. The oils are selected from those ordinarily used in conjunction with the specific rubber or rubbers present in the composition.

III. Modifier

According to the present invention the functionalized polymer used as modifier is selected from functionalized polyolefins or functionalized block-copolymers of styrene/conjugated diene/styrene. In the functionalized block-copolymers of styrene/conjugated diene/styrene the conjugated diene may be hydrogenated, non-hydrogenated or partially hydrogenated.

The presence of a copolymer of functionalized polymers and polyamide in the thermoplastic elastomers significantly improves the weldability of thermoplastic elastomers and particularly those mentioned above. The copolymers of functionalized polymers and polyamides can be prepared by condensation reaction of functionalized polymers and polyamides. This type of reaction is known to those skilled in the art (F. Ide and A. Hasegawa, *J. Appl. Polym. Sci.*, 18 (1974) 963; S. Hosoda, K. Kojima, Y. Kanda and M. Aoyagi, *Polym. Networks Blends*, 1 (1991) 51; S. J. Park, B. K. Kim and H. M. Heong, *Eur. Polym. J.*, 26 (1990) 131). The reactions described in these references can easily be transferred to the other functionalized polymers mentioned below.

The polyolefins of the functionalized polyolefins can be homopolymers of alpha-olefins such as ethylene, propylene, 1-butene, 1-hexene, and 4-methyl-1-pentene, and copolymers of ethylene with one or more alpha-olefins. Preferable among the polyolefins are low-density polyethylene, linear low-density polyethylene, medium- and high-density polyethylene, polypropylene, and propylene-ethylene random or block copolymers as well as ethylene-vinylacetate copolymer (EVA), ethylene-acrylic acid copolymer (EAA) and their ionomeric derivatives, such as the Zn- and Na-containing salts, and ethylene-(meth)acrylate copolymer, such as EMA.

In the block-copolymers of styrene/conjugated diene/styrene, which are traditionally made by anionic polymerization and in which the conjugated diene may be hydrogenated, non-hydrogenated or partially hydrogenated, the conjugated diene is selected from butadiene, isoprene or a mixture of both. Specific block-copolymers of the styrene/conjugated diene/styrene-type are SBS, SIS, SIBS, SEBS and SEPS block-copolymers.

The functionalized polymers contain one or more functional groups which have been incorporated either by grafting or by copolymerization. Preferably the functionalized polymers used in this invention are those obtained by grafting at least one kind of functional group-containing monomer on the polymer backbone, which is, as mentioned above, selected from the polyolefins or the block-copolymers. It is preferred, however, to use one kind of functional group-containing monomer.

The functional group-containing monomers are selected from carboxylic acids, dicarboxylic acids, their derivatives such as their anhydrides, oxazoline- or epoxy-group containing monomers, or amino- or hydroxy-group containing monomers.

Examples of the monomers containing one or two carboxylic groups are those having 3 to 20 carbon atoms per molecule such as acrylic acid, methacrylic acid, maleic acid, fumaric acid and itaconic acid or derivatives thereof.

Unsaturated dicarboxylic acid monomers having 4 to 10 carbon atoms per molecule and anhydrides (if they exist) thereof are the preferred grafting monomers. These grafting monomers include for example, maleic acid, fumaric acid, itaconic acid, citraconic acid, cyclohex-4-ene-1,2-dicarboxylic acid, bicyclo[2.21] hept-5-ene-2,3-dicarboxylic acid, maleic anhydride, itaconic anhydride, citraconic anhydride, allylsuccinic anhydride, 4-methylcyclohex-4-ene-1,2-dicarboxylic anhydride and bicyclo[2.2.1] hept-5-ene-2,3-dicarboxylic anhydride.

Examples of oxazoline-group containing monomers are oxazole, ricinoloxazoline maleinate, vinyloxazoline, 2-isopropenyl-2-oxazoline, etc.

Examples of epoxy-group containing monomers are epoxides of esters of unsaturated carboxylic acids containing at least 6, preferably 7 carbon atoms. Particularly preferred are glycidyl acrylate and glycidyl methacrylate.

Examples of the amino-group containing monomers are reaction-products of primary and/or secondary diamines with an anhydride of an unsaturated carboxylic acid as mentioned above.

Examples of the hydroxy-group containing monomers are reaction products of primary or secondary amino-alcohols (primary or secondary amine) with an anhydride of an unsaturated carboxylic acid as mentioned above.

In case that an amine or hydroxy group is present in the resulting functionalized polymer a coupling agent such as an diisocyanate could be necessary to link this type of functional polymer to the polyamide.

Various known methods can be used to graft the grafting monomer to the basic polymer. For example, this can be achieved by heating the polymer and the grafting monomer at high temperatures of from about 150 °C. to about 300 °C. in the presence or absence of a solvent with or without a radical initiator. Another vinyl monomer may be present during the grafting reaction. Suitable solvents that may be used in this reaction include benzene, toluene, xylene, chlorobenzene and cumene. Suitable radical initiators that may be used include t-butyl hydroperoxide, diisopropylbenzene hydroperoxide, di-t-butyl peroxide, t-butyl cumyl peroxide, acetyl peroxide, benzoyl peroxide, isobutyryl peroxide and methylethyl ketone peroxide.

The functionalized polymer can also be made by copolymerization of the functional group-containing monomer with the monomers mentioned above in connection with the polyolefins.

In the functionalized polymer thus obtained, the amount of the functional group-containing monomer is preferably about 0.3 to about 10%, more preferably about 0.3 to about 5%, and most preferably at least about 1 weight %, based on the weight of the functionalized polymer.

The polyamides are preferably selected from polymers of ε-caprolactam, aminocaproic acid, enantholactam, 7-aminoheptanoic acid, 11-aminoundecanoic acid, etc., or polymers obtained by polycondensation of diamines (such as butanediamine, hexamethylenediamine, nonamethylenediamine, undecamethylenediamine, dodecamethylenediamine, m-xylenediamine, etc) with dicarboxylic acids (such as terephthalic acid, isophthalic acid, adipic acid, sebacic acid, dodecanedibasic acid, glutaric acid, etc.), copolymers thereof or blends thereof. Specific examples include aliphatic polyamide resins (such as polyamide 4.6, polyamide 6, polyamide 6.6, polyamide 6.10, polyamide 11, polyamide 12, and polyamide 6.12) and aromatic polyamide resins (such as poly (hexamethylenediamine terephthalamide), poly (hexamethylene isophthalamide), xylene group-containing polyamides and amorphous polyamide). Among them, polyamide 6, polyamide 6.6, and polyamide 12 are preferred.

It has to be noted that the copolymer of the functionalized polymer and the polyamide can first be prepared as such (e.g. in a twin screw extruder) and then melt-mixed or dry-blended with the thermoplastic elastomer composition before processing. Alternatively, the functionalized polymer and polyamide can be melt mixed with the thermoplastic elastomer composition in one step. This melt-mixing can be made either on down-stream during manufacturing of the thermoplastic elastomer or in a second pass in a Banbury, single or double screw extruder.

Preferably the amount of the functionalized polymer is about 20 to about 70 weight % and the amount of the polyamide is about 80 to about 30 weight %. Most preferably, however, the amount of the functionalized polymer is about 30 to about 60 weight % and the amount of the polyamide is about 70 to about 40 weight %, all amounts based on the total weight of the functionalized polymer and polyamide.

The amount of copolymer obtainable by the reaction of functionalized polyolefin and the polyamide and the amount of copolymer obtainable by the reaction of functionalized styrene/conjugated diene/styrene block-copolymer (hydrogenated, non-hydrogenated or partly hydrogenated) and the polyamide in the thermoplastic elastomer ("TPE"), whether added to the elastomer as the copolymer or as the yet ungrafted reactants as above-described, is at least 3 weight parts [(i), (ii) or (iii)] per 100 weight parts of the nonpolar thermoplastic elastomer (A), (B) or (C), as defined above.

As far as the processing of the above-described compositions and the manufacture of the specific modified weldable thermoplastic elastomers is concerned, it is referred to WO-A-95/26380, the contents of which is fully incorporated herein by reference.

IV. High Frequency Welding

The technology of high frequency welding of polymers is well known in the art. For additional information it is referred to the already published literature, for instance "Hochfrequenzschweisen in der Kunststofftechnik", authors U. W. Rische et al, Herfurth GmbH (editor), Hamburg, Germany, 1986 and the references cited therein.

The method according to the present invention can advantageously be used to weld films (thickness less than 300 μm), sheets (thickness 300 μm to 2 mm), boards (thickness above 2 mm), extruded profiles/hoses, injection or blow molded parts, or surfaces of articles of any other shape permanently together.

The invention will be better understood by reference to the following examples which serve to illustrate but not to limit the present invention.

V. Examples

The following abbreviations are used in the examples:
S 211-55: Santoprene® rubber (blend of propylene and fully cured EPDM and common additives) having a hardness of 55 (ASTM D-2240), Advanced Elastomer Systems, Akron, U.S.

MHA-PP: maleated polypropylene containing 1.5% by weight of grafted maleic acid anhydride
Ultramid® B3: polyamide 6 (BASF)
Kraton® G 1650: styrene/ethylene/butylene/styrene block-copolymer containing about 27% styrene (Shell)
Kraton® G 1901: maleic anhydride grafted SEBS rubber (about 2 wt.-% maleic anhydride and about 30 wt.-% styrene)
Flexon® 876: process oil (Esso)

A standard high frequency equipment (for example of Schwalbach or Herfurth GmbH, both of Germany) was used to carry out the welding of the samples.

The following conditions were used for welding:
Frequency: 27.120 MHz
Total Energy: 5 kW
Welding time: 8 sec
cooling time: 10 sec The samples (extruded stripes) welded had a thickness of 2 mm.

In the following "100% cohesion" means that during the peel test no separation at the interface of welded sheets occurs, but tear occurs in the mass of one or both of the welded sheets.

TABLE 1

|  | Example 1 wt.-% | Example 2 wt.-% | Example 3 wt.-% | Example 4 wt.-% |
| --- | --- | --- | --- | --- |
| Santoprene ® 211-55 | 80 | 86 | 90 | 94 |
| MHA-PP | 10 | 7 | 5 | 3 |
| Utramid 83 | 10 | 7 | 5 | 3 |
| High frequency welding result | 100% cohesive | 100% cohesive | 100% cohesive | 100% cohesive*) |

*)100% cohesive obtained by applying two high frequency welding cycles

EXAMPLE 5

TABLE 2

| Kraton ® G 1650 | 41.5 wt % |
| --- | --- |
| Flexon 876 | 16.6 wt % |
| CaCO$_3$ | 24.9 wt % |
| Kraton ® G 1901 | 5 wt % |
| Ultramid ® B3 | 12 wt % |
| Total | 100 wt % |

High frequency welding conducted on this typical SEBS compound (Table 2) showed excellent interfacial bonding, resulting in a tearing of the thermoplastic elastomer mass and not at the bonding.

What is claimed is:

1. A method of bonding surfaces of a non-polar olefinic thermoplastic elastomer (tpe) which tpe comprises
   (a) a thermoplastic polyolefin homopolymer or copolymer,
   (b) an olefinic rubber which is fully crosslinked,
   (c) optional common additives, and
   (d) from 3 to 60 weight parts, per 100 weight parts of said TPE, of a polar modifier comprising
      a copolymer obtainable by the condensation reaction of about 10 to about 90% by weight of a functionalized polymer with about 90 to about 10% by weight of a polyamide, based on the total weight of functionalized polymer and polyamide,
      with the proviso that the functionalized polymer contains no less than about 0.3% by weight, based on the total weight of the functionalized polymer, of at least one functional group containing monomer,
      by the steps of contacting the surfaces of said non-polar TPE and subjecting said surfaces to high frequency welding conditions.

2. The method of claims 1 wherein the polyolefin is selected from a homopolymer or copolymer of a $C_{2-7}$ monomer or a copolymer thereof with (meth)acrylates and/or vinyl acetates.

3. The method of claim 2 wherein the copolymer is a copolymer of ethylene with (meth)acrylates and/or vinyl acetates.

4. The method of claim 1 wherein the rubber is selected from the group consisting of EPDM rubber, EPM rubber, butyl rubber, halogenated butyl rubber, copolymers of isomonoolefin and para-alkylstyrene or their halogenated derivatives, natural or synthetic rubber, and mixtures thereof.

5. The method of claim 1 characterized in that the functionalized polymer is selected from functionalized polyolefins or functionalized block copolymers of styrene/conjugated diene/styrene, wherein the conjugated diene may be hydrogenated, non-hydrogenated or partially hydrogenated.

6. The method of claim 5, wherein the functionalized polymers are obtainable by grafting on the polyolefins or block-copolymers of styrene/conjugated diene/styrene grafting monomers selected from carboxylic acids, dicarboxylic acids or their derivatives, oxazoline-group containing monomers, epoxy-group containing monomers, amino- or hydroxy-group containing monomers.

7. The method of claim 6, wherein the derivatives of the dicarboxylic acid monomers are selected from their anhydrides.

8. The method of claim 1, wherein the polyamide is selected from polymers of ε-caprolactam, aminocaproic acid, enantholactam, 7-amino-heptanoic acid, 11-aminoundecanoic acid, polymers obtained by polycondensation of diamines with dicarboxylic acids, copolymers thereof or blends thereof.

9. A shaped article obtainable by the welding method according to claim 1.

* * * * *